June 25, 1957 W. L. MORGAN 2,796,805
REARVIEW MIRROR

Filed Jan. 2, 1953 3 Sheets-Sheet 1

Inventor
Willard L. Morgan
By Nobbe & Swope
Attorneys

June 25, 1957   W. L. MORGAN   2,796,805
REARVIEW MIRROR
Filed Jan. 2, 1953   3 Sheets-Sheet 2
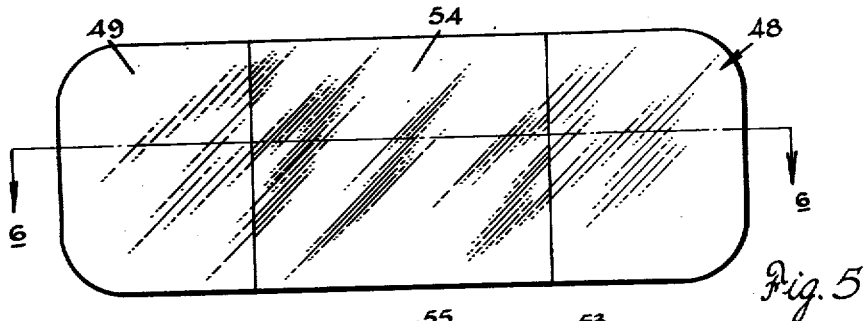
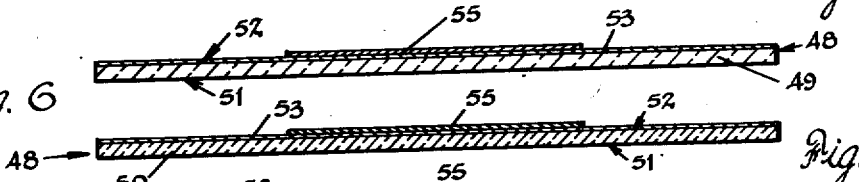
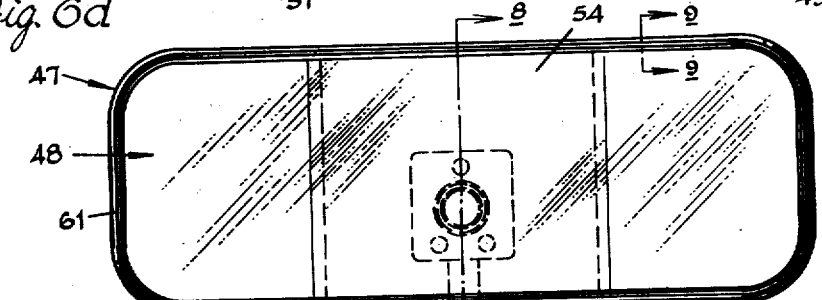
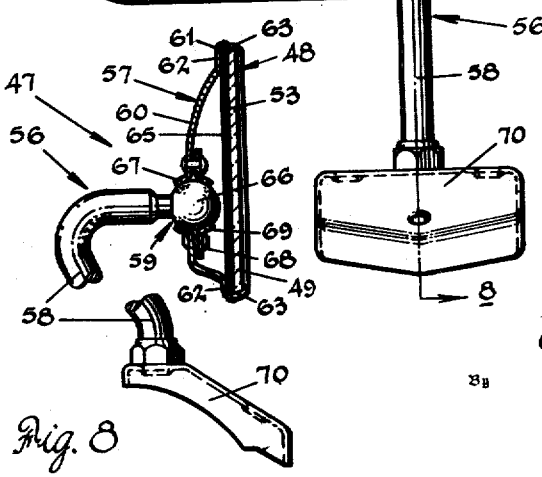
Inventor
Willard L. Morgan
Nobbe & Swope
Attorneys

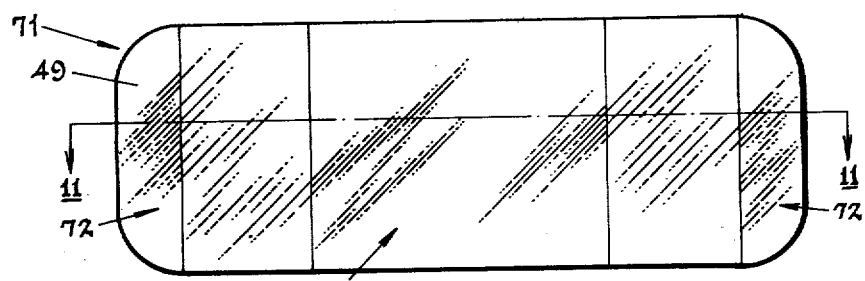
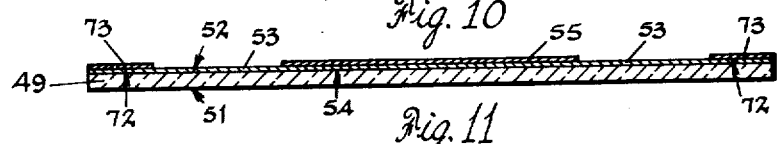
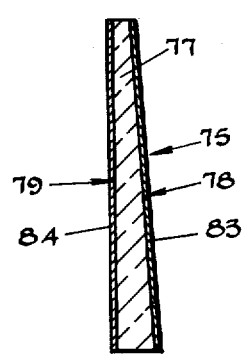 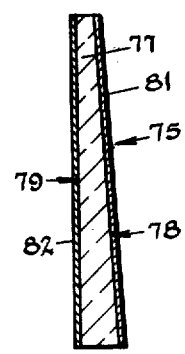 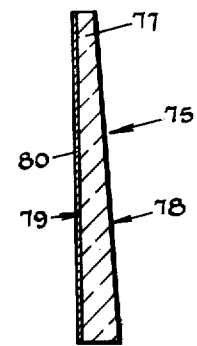
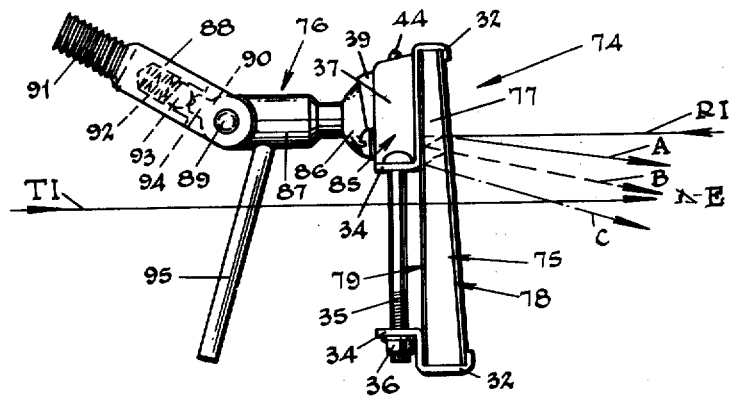

United States Patent Office 2,796,805
Patented June 25, 1957

2,796,805

REARVIEW MIRROR

Willard L. Morgan, Pittsburgh, Pa., assignor to Libbey-Owens-Ford Glass Company, Toledo, Ohio, a corporation of Ohio Application January 2, 1953, Serial No. 329,250

6 Claims. (Cl. 88—77)

This invention relates broadly to rear view mirrors for automobiles and the like. More particularly, it relates to a novel rear view mirror providing rear view vision of clear reflected images as well as a wide range of front view vision through at least a portion thereof.

Wider back windows in automobiles have brought about a parallel demand for rear view mirrors of greater overall length so that all that can be seen through said back windows may be covered by said mirrors. Thus, rear view mirrors have had to be increased in length from 5 to 6 inches up to as much as 9 to 10 inches or more. While these large mirrors provide excellent operation from the standpoint of rear vision, it has been found that they block out such a large zone of forward or front vision that the ability to see out the windshield of the automobile has been seriously impaired in many instances and that direct head-on collisions have been traceable thereto. With such large mirrors it is particularly difficult in looking through the windshield to see a road which comes in from the right side of the driver, or which runs up a hill at a small angle to the level of the automobile or, on the other hand, a road which is level and at a small angle to a downwardly moving automobile. Similarly, the large mirrors have been found objectionable in blocking out vision of traffic signals as well as portions of the scenery from both the driver's and passenger's seats.

The present invention materially lessens these front view difficulties, and at the same time provides a complete coverage of the rear automobile window, by providing a mirror at least a portion of which is partially transparent and at the same time reflective to present clear pictures of the rear road conditions. It has been found that if a partially transparent reflective mirror film is applied to a polished glass surface and this is installed as a automobile rear view mirror, the eye can alternatively focus on an image of the rear road conditions or, by changing its focus, may look directly through the mirror.

It is apparent, however, that light comes to the eye from the surrounding objects both to the rear and to the front and that there is therefore in the eye a dilution of the image which is actually focused upon and of which the driver is aware by the stray light arriving from the other image which is not directly perceived. Such stray light has a tendency to make the other image less apparent and dilute the contrast in said image in much the same manner as where a projected moving picture or television picture is made less apparent when room lights are turned on and light is permitted to fall upon the image pictures. It is apparent from this that under the wide range of light conditions which exists during the day, as well as the varying light conditions from the roads and automobiles, there are limits of relative reflective and transmission values within which a partially transparent mirror will operate satisfactorily as a rear view automobile mirror. Thus, a piece of ordinary glass could not be used as a rear view automobile mirror since the reflected image would be too faint to be seen against the transmitted views.

I have found that satisfactory partially transparent automobile rear view mirrors may be secured when a certain ratio exists between the amount of transmitted light coming through the mirror to the amount of light reflected therefrom. More particularly, I have found that mirrors in which the ratio of these two properties one to the other falls between approximately 2.7 over 1 and 1 over 2.7 or 0.37 are satisfactory as rear view mirrors and that mirrors with substantially higher or lower ratios of transmission to reflectivity are confusing and unsuitable. For example, where the ratio of the reflectivity to the transmission is greater than 2.7 over 1, it is impossible to see through a rear view mirror in the normal usage where one does not have time to strain the eyes to do so and where the driver is at a considerable distance from the mirror.

I have found that this ratio of properties within the mirror limits the images produced in the eye under daylight driving conditions to a brightness ratio of approximately 5 to 1 or 1 to 5 and that under such conditions one clearly can readily discriminate either of the reflected or transmitted views. This ratio is obviously related closely to the brightness of direct sunlight which is 10,000 foot-candles, to the brightness of blue sky which is 1,500 foot-candles, to the brightness of sunlit clouds which ranges from 1,300 to 1,500 foot-candles, to the brightness of sunlit concrete paving ranging from 400 to 700 foot-candles, to the brightness of asphalt roads which ranges from 150 to 500 foot-candles, and to the reflected brightness of automobiles of various shades and types of paint which, in the case of black cars ranges from 500 to 600 foot-candles, blue cars from 700 to 900 foot-candles and white cars approximately 1,300 foot-candles, the chromium on said cars reflecting in the order of 1,700 to 1,900 foot-candles. The reflectivity from buildings and from green foliage falls in the range of 100 to 500 foot-candles. The illumination inside of automobiles on a bright sunny day (for which the above figures are given), is generally found to be in the neighborhood of 100 foot-candles. On dull or overcast days the illumination conditions generally are much more uniform and it has been found that a mirror which is operative upon bright sunlit days works perfectly on such dull or overcast days. The same is true for mirrors operating under night conditions where the contrast conditions are far from critical since the images are primarily of the same brightness for automobile headlights either behind or forward of the car.

By way of illustration, one of the most difficult driving conditions to be met with the partially transparent rear view mirror of this invention occurs during driving up an incline, such that the mirror is shadowed against the sky which is full of clouds lit by the sun from behind the automobile. Such clouds would be roughly 1,500 foot-candles and if the mirror is of 28% light transmission, the brightness of the image received on the eye from the clouds would be approximately 375 foot-candles. If the eye is focused at the mirror on a car or a road to the rear and such car is of 800 foot-candles and the mirror is of 14% reflectivity, the brightness of the image of the automobile in the eye is approximately 112 foot-candles. In this case, which is illustrative of a mirror found suitable for use in which the ratio of transmitted to reflected light is 28%/14% or 2.0, it will be seen that at the eye the transmitted image is somewhat in excess of 3 times 800/375 as bright as the reflected image, but under such circumstances, the reflected image can be readily and clearly seen. By means of similar measurements, it has been found that when partially transparent mirrors are employed in a car under such an extreme condition as outlined, and when the ratio of the two images has exceeded the ratio limits 5 to 1 or 1 to 5, the mirror immediately causes trouble.

I have found then that under such extreme driving conditions mirrors having a ratio of transmission to reflection which falls within the limits of approximately 2.7 over 1 to 1 over 2.7 operate satisfactorily and such mirrors are based upon the ratio of the images on the eye being within the 5 to 1 or 1 to 5 ratio. My discovery of the 2.7 factor was determined from the above outlined auto driving conditions of extreme ratio of brightnesses, during which various mirrors of widely different transmission and reflection values were used. That is, 800 foot-candles times the reflectivity times 5 is taken to equal 1500 times the maximum transmission permissible in a useful mirror when the images arriving in the eye from the automobile and from the road are at the extreme ratio of exactly 5 to 1. From such equation, it becomes apparent that the ratio for maximum transmission permissible under the reflection equals approximately 2.7 since:

$$T \max. = \frac{800 \times 5 \times R}{1500}$$

$$= 2.7R$$

It is a primary object of this invention to provide a rear view mirror for automobiles or the like, which will provide the driver with a wide range of vision through the back window of the automobile with little or no obstruction of front view vision through the windshield.

Still another object of this invention is to provide a rear view mirror of the type described which is reflective as well as partially transparent to permit clear vision through either the back window or the windshield of the automobile under varying light conditions and without undue effort on the part of the driver.

Still another object of this invention is to provide a partially transparent mirror suitable for use as an automobile rear view mirror.

Still another object of this invention is to provide a mirror having a partially transparent reflective coating to establish a predetermined ratio of reflectivity to transmission therethrough by means of which said mirror is made best suitable for use as a rear view mirror for automobiles and the like.

Still another object of this invention is to provide a partially transparent rear view mirror of the type described which may be adjusted for optimum driving conditions under varying light conditions.

Still another object of this invention is to provide a novel mounting for a rear view mirror of the type described which will permit said mirror to carry out the aforesaid objects.

Other objects and advantages of the invention will become more apparent during the course of the following description when taken in connection with the accompanying drawings.

In the accompanying drawings, wherein like numerals are employed to designate like parts throughout the same:

Fig. 5 is a front view of another type of rear view mirror constructed in accordance with this invention, and with the mounting therefor removed.

Fig. 6 is a longitudinal sectional view taken substantially along line 6—6 of Fig. 5, and showing one form of the type of mirror shown in said figure;

Figs. 6a to 6d are views similar to Fig. 6 and showing other forms of the type of mirror shown in Fig. 5;

Fig. 7 is a front view of the type of mirror shown in Fig. 5 in assembly with the mounting therefor;

Fig. 8 is a broken transverse sectional view of this type of mirror taken substantially along line 8—8;

Fig. 9 is a detail sectional view taken substantially along line 9—9 of Fig. 7, and showing the mounting bezel attached to the mirror element;

Fig. 10 is a front view of a slightly modified type of rear view mirror constructed in accordance with this invention, and with the mounting therefor removed;

Fig. 11 is a longitudinal sectional view of the mirror of Fig. 10 taken substantially along line 11—11;

Fig. 12 is a side view of still another type of rear view mirror assembly constructed in accordance with this invention;

Fig. 13 is a transverse sectional view of one form of the type of mirror shown in Fig. 12 with the mounting therefor removed; and Figs. 13a and 13b are views similar to Fig. 13, showing other forms of the type of mirror shown in Fig. 12.

Figure 1:
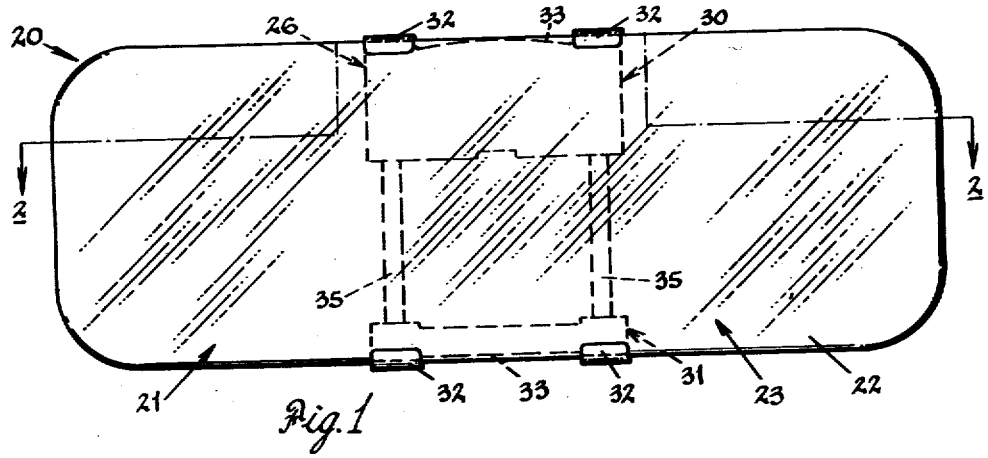
Fig. 1 is a front view of one type of rear view mirror assembly constructed in accordance with this invention.
Figure 2:
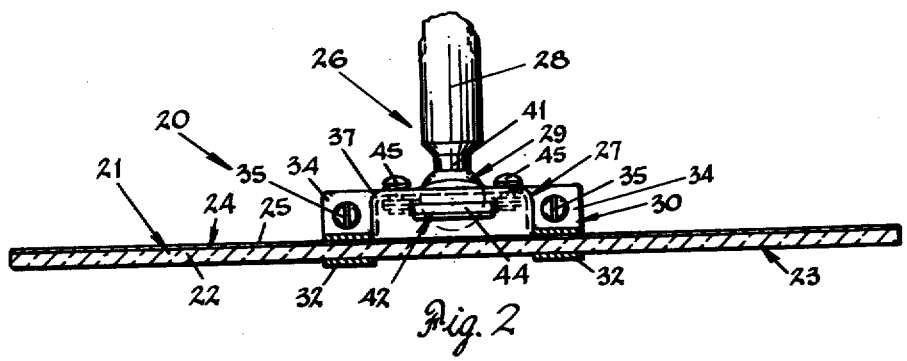
Fig. 2 is a longitudinal sectional view of the mirror of Fig. 1 taken substantially along line 2—2.
Figure 3:
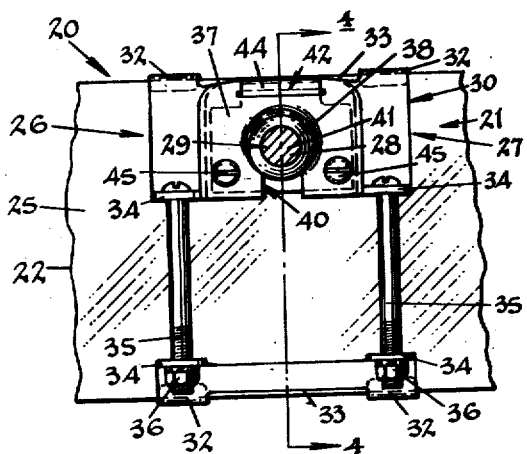
Fig. 3 is a fragmentary rear view of the mirror.
Figure 4:
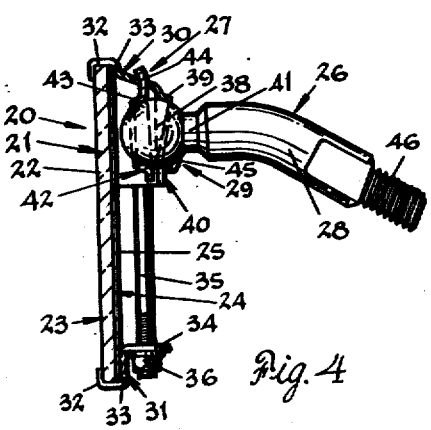
Fig. 4 is a transverse sectional view of the mirror taken substantially along line 4—4 of Fig. 3.

Referring now particularly to the above-described drawings, there is shown in Figs. 1 to 4 one type of rear view mirror assembly, constructed in accordance with this invention and designated in its entirety by the numeral 20. This mirror assembly comprises a mirror member 21 composed of a substantially rectangular support body 22 of partially transparent glass or other refractive material, having opposite polished and parallel front and rear surfaces 23 and 24, respectively, upon one of which is formed a partially transparent reflective coating 25, and a mounting 26 for attaching said mirror to a rigid part of an automobile or the like in proper disposition with respect to a driver's field of vision.

The support body 22 may be composed of ordinary clear window or plate glass or, if desired, of a light absorptive glass more particularly described in the examples to follow. The partially transparent reflective coating 25 may, as noted above, be formed on either the front surface 23 or rear surface 24 (as shown in Figs. 1 to 4) of the support body by any well-known method of mirror coating. A wide range of different types of mirror coatings are contemplated by this invention and will be more particularly described hereinafter.

The novel mounting 26 for mirror member 21 is especially constructed to carry out the objects of this invention by providing adequate support for said mirror member while at the same time permitting light transmission through as much of said member as is possible. This mounting comprises generally a skeleton-type frame member 27 over only a portion of the rear surface 24 and coating 25 of the mirror member 21, an arm 28 projecting rearwardly therefrom, and means 29 connecting said frame to said arm.

The frame member 27 includes spaced upper and lower sections 30 and 31, respectively, of any suitable light metal and having bent-over fingers 32 which securely grip the longitudinal edges of mirror member 21, said fingers being spaced apart by slightly recessed portions 33. Alternatively, of course, said fingers may extend the entire width of the frame sections. Opposite the fingers 32, the frame sections 30 and 31 are provided with flanged portions 34 which receive screws 35 extending between the sections and by means of which said sections may be maintained through nuts 36 in actively gripping relation with the edges of mirror member 21. It will be understood that the means of attaching frame member 27 to mirror member 21 not only permits said frame to be readily detached therefrom but also permits said frame to be adjusted longitudinally of the mirror member to any desired position by the mere manipulation of nuts 36.

The central portion 37 of upper frame section 30 is raised outwardly to receive a ball member 38 on the inwardly disposed end of arm 28 in a seat 39 (Fig. 4) formed in said raised portion. A slot 40 is provided in the raised portion 37 to permit the reduced neck portion 41 of the arm 28 to be passed therethrough. Strap 42 having a seat portion 43 is disposed inwardly of said raised portion for maintaining ball member 38 of the arm 28 in slidably engaged position between said seat portion 43 and seat portion 39 on raised portion 37. Tongue 44 at the upper end of said strap is inserted through a slot in said raised portion and screws 45 at the lower end thereof serve to maintain ball member 38 in its above described operative position. It will thus be understood that the mirror and frame members may be moved universally with respect to arm 28 to dispose said mirror in the desired position. It will further be understood that the ball-and-socket means 29 formed by ball member 38 and seat portions 39 and 43 permit said mirror and frame members to be readily detached from arm 28.

The outer end of arm 28 is suitably threaded, as at 46, to permit said arm to be secured to a rigid part of an automobile or the like. Of course, the length of the arm may be bent as desired in order to dispose the mirror in the most suitable place for the driver's purposes.

Another type of rear view mirror assembly constructed in accordance with this invention is illustrated in Figs. 5 to 9 and designated in its entirety by the numeral 47 (Figs. 7 and 8). This type of mirror assembly includes a mirror member 48, more particularly shown in Figs. 5, 6, and 6a to 6d, which comprises a substantially rectangular support body 49 of partially transparent glass (Figs. 6, 6b, 6c and 6d) or, if desired, a support body 50 of light absorptive glass (Fig. 6a), said support body having opposite polished and parallel front and rear surfaces 51 and 52, respectively, upon one of which is formed a partially transparent reflective coating 53. This coating which, similarly to mirror coating 25 of Figs. 1 to 4, will be more particularly described hereinafter, may be formed on either the front surface 51 of the support body 49, as shown for example in Fig. 6b, or the rear surface 52, as shown for example in Figs. 6, 6a, 6c and 6d. For purposes of illustration, however, the mirror assembly 47 is shown in connection with the latter form wherein the coating 53 is formed on the rear surface 52.

In addition, in this type of rear view mirror assembly, there is formed over a portion of the mirror member 48 an opaque area 54 (Figs. 6 and 7) which may either be reflective in itself or positioned behind the reflective coating 53, so that in either case the entire surface of the mirror is reflective. Experiments have shown that optimum operating conditions are obtained when this opaque area extends for approximately the central 3 or 4 inches of width of said mirror member although this invention is not to be restricted thereto. The opaque area need not be of rectangular shape and it is obvious that it need not extend completely from the top to the bottom edges of the mirror. In general, however, this opaque area serves not only as a shield for a mounting disposed behind the mirror member 48 but also, due to its reflectivity, aids in rapid focusing selectively on the reflected image. Thus, the entire width of the mirror assembly, including both the opaque and non-opaque or light transmittive areas thereof, are reflective for the purposes of rear view vision. In this connection, said opaque area comprises an opaque coating 55 which is preferably formed on the rear surface 52 of support body 49 or 50 and, as indicated above, may consist of a coating of non-reflective black paint behind a reflective mirror coating or, if desired, any suitable opaque reflective mirror coating. In this connection, it will be understood that said opaque mirror coating may be but is not necessarily of the same reflectivity as partially transparent mirror coating 53. The coating 55 may, as shown in Figs. 6 and 6a, be placed over and behind the partially transparent reflective coating 53 or, when said coating 53 is disposed on the front surface 51 of support body 49, may be placed directly upon the rear surface 52 thereof, as shown in Fig. 6b. Of course, in any one of these cases, the opaque coating 55 may be either reflective or non-reflective, as noted above. Alternatively, a reflective opaque coating 55 may be placed directly upon the rear surface 52 and the reflective mirror coating 53 either extended thereover, as shown in Fig. 6d, or placed on the rear surface 52 of the support body at each side of and adjacent to said opaque coating, as shown in Fig. 6c. It will be understood that in the latter two cases, the opaque coating 55 is necessarily of the reflective variety in order that the entire surface of the support body be rendered reflective.

It will be obvious also that while the mirrors of Figures 6, 6a, 6c, and 6d have been described in connection with surface 52, designated as the rear surface, these mirrors could be turned around and used with the same coatings, where coating 55 is reflective, as front surface rear view mirrors. The coatings would then be on the front surface of the supports. Likewise, where an opaque reflective coating 55 is employed with a mirror as shown in Fig. 6b, the mirror need not be used with surface 52 as the rear surface but may be turned over to dispose the opaque coating 55 on the front surface and mirror coating 53 on the rear surface.

Of course, for this type of rear view mirror a mounting similar to the member 26 of Figs. 1 to 4 may be provided. However, a modified type of mounting, designated in its entirety by the numeral 56, is also contemplated by this invention and has been found especially well-suited for the mirror member 48 having an opaque area 54 (Fig. 7) centrally thereof. This novel mounting 56 comprises a frame 57 of any suitable light metal, an arm 58 extending rearwardly thereof, and means 59 connecting the frame to the bracket member.

The frame 57 includes a raised central portion 60, over and corresponding to the opaque area 54 of the mirror member, and a bezel 61 surrounding said central portion of the frame as well as the periphery of the non-opaque or light transmittive area of said mirror member. This bezel 61 includes a flat rim portion 62 and a bent-over flange portion 63 which serve to securely grip the beveled edges 64 (as best shown in Fig. 9) of the mirror member. As well, a paper or cardboard liner 65 corresponding approximately to opaque area 54 may be disposed behind the mirror member 48 and the coatings thereon and actively held in place by said bezel. As shown in Fig. 9, a narrow strip of said liner corresponding to rim portion 62 may be extended around the entire periphery of the mirror.

The raised central portion 60 of the frame receives a ball member 66 on the inwardly disposed end of the arm 58 in a seat 67 formed therein. A strap 68 having a similar seat 69 is disposed inwardly of said portion and is bolted thereto in such a manner as to maintain ball member 66 in slidably engaged position between seats 67 and 69. Thus, the mirror and frame members of this rear view mirror assembly may be moved universally with respect to arm 58 to dispose the mirror surface in the desired position.

The arm 58 may be bent as desired and is secured at its outwardly disposed end to a bracket member 70 which may be attached in any suitable manner to a rigid part of an automobile or the like.

There is shown in Figs. 10 and 11 a slightly modified type of rear view mirror member, which is designated in its entirety by the numeral 71 and comprises a substantially rectangular support body 49 having opposite front and rear surfaces 51 and 52, respectively, upon one of which is formed a partially transparent reflective coating 53, each of the foregoing corresponding to identical members of mirror member 48 shown in Figs. 5 to 9. In addition and again similarly to the mirror member 48 of Figs. 5 to 9, there is formed over the central two or more inches of width of the mirror member an opaque reflective area 54 (Fig. 10). As previously noted, this opaque area comprises a coating 55 consisting of a non-reflective black paint or, if desired, any suitable opaque reflective mirror coating. As well, the respective coatings 53 and 55 may be applied to the surface of support body 49 in any one of the various manners suggested in connection with Figs. 6 to 6d.

In this slightly modified construction, however, opaque reflective areas 72 (Fig. 10) are also provided at the opposite extreme end areas of mirror member 71. These latter opaque end areas may extend for about ½ to 2 inches from the opposite extreme ends of the mirror member and comprise opaque coatings 73 similar to coating 55. These areas have been found particularly helpful to the driver in quickly locating automobiles approaching from the rear in lanes parallel to and at either side of the driver as said automobiles first move into the line of the driver's rear view vision on the edges of the mirror. Normally an automobile approaching from directly behind the driver first appears in the center of the mirror. Of course, in this respect the dimensions noted above for the end areas are arbitrary and will depend upon the overall width of the mirror as well as the desired width of central opaque area 54.

Although a mounting has not been shown in connection with this slightly modified mirror member 71, it will be readily apparent that either the type of mounting 26, as shown in Figs. 1 to 4, or the mounting 56, as shown in Figs. 5 to 9, may be employed. Also, if desired, the flat rim portion 62 as well as the cardboard liner 65 of a mounting similar to member 56 may be extended over the opaque areas 72 at each end of mirror member 71 to lend additional stability to the bezel 61 surrounding the same.

The rear view mirror assembly designated in its entirety by the numeral 74 and shown in Fig. 12 is still another type constructed in accordance with this invention. The mirror member 75 shown generally therein, as well as more particularly in the forms of Figs. 13, 13a and 13b, is of the "wedge" type and is supported from a particular type of mounting 76 whereby the partially transparent support body 77 of glass or other refractive material may be readily moved to the desired position and the opposite non-parallel front and rear reflective surfaces 78 and 79, respectively, thereof alternately moved into positions relative to the driver's eye so as to selectively permit rear view vision from either of said surfaces.

As is well known in the art, the purpose of the "wedge" type rear view mirror, in selectively permitting rear view vision from either of the non-parallel reflective surfaces thereof, is to provide the driver with a choice of rear view images of various brightnesses. More particularly, by means of the rear view mirror assembly 74, the driver may alternately locate two or more rear view images of differing light intensities of the same limited common field of rear view in his normal line of sight by selectively positioning the mirror element 75 by angular adjustment of the mounting 76. By way of illustration, there is shown in Fig. 12, an incident ray of light Ri from a rear view image, which ray strikes the front surface 78 of support body 77 and is partially reflected therefrom as at A. Inasmuch as said front surface is partially transparent, as will be explained hereinafter, a portion of said incident ray will be transmitted to the rear surface 79 of the support body and be reflected therefrom as at B and transmitted through front surface 78. In addition, a portion of the ray reflected from the rear surface 79 will be reflected from the front surface 78 and then reflected from said rear surface as at C. Thus, it will be apparent that with the construction shown herein, three rear view images of different light intensity may be presented to the eye of the driver by manipulation of mounting 76, in a manner to be explained, in angularly disposing the surfaces of mirror member 75 in the desired position.

By way of illustration, the mirror assembly shown in Fig. 12 is disposed in such a position as to provide the eye E of the driver with a reflection as at B of the rear view image from the rear surface 79 of the support body 77. As well, ray Ti indicates an incident ray from a front view image and transmitted through a partially transparent portion of rear surface 79 and partially transparent front surface 78 of mirror member 75 to the driver's eye E.

It will be understood that the particular "wedge" type rear view mirror illustrated herein does not form a part of this invention except in connection with the construction thereof which permits rear view vision as well as front view vision through at least a portion thereof. That is, the particular types of mirror members 75 illustrated are old in the art insofar as the types of images produced thereby are concerned. That is, for example, in the mirror member 75 shown in Fig. 13b, the front surface 78 of support body 77 is uncoated and is reflective only to the extent of the polished glass itself while there is placed over the rear surface 79 a partially transparent reflective coating 80. As described in Patent No. 1,949,138 to W. J. Bell, a plurality of rays of different light intensities are reflected from a rear view mirror of this type. Similarly, in Patent No. 2,397,947 to W. H. Colbert, there is shown a "wedge" type mirror having a front surface partially transparent mirror coating of relatively low reflectivity and a rear surface coating of relatively higher reflectivity corresponding, respectively, to the partially transparent reflective coatings 81 and 82 of mirror member 75 shown in Fig. 13a. In a copending application, Serial No. 235,790, filed by D. W. Barkley and assigned to the assignee of this application, there is disclosed still another type of "wedge" mirror in which the front surface partially transparent mirror coating is of relatively high reflectivity and the rear surface coating of relatively lower reflectivity corresponding, respectively, to the partially transparent reflective coating 83 and 84 of mirror member 75 shown in Fig. 13.

According to this invention, however, as noted above each of the mirror coatings 80 to 84 are, in addition to being reflective in the manner and for the purposes described with respect to the prior art, partially transparent for the purposes of the present invention. That is, the rear view mirror assembly 74 is not only productive of the many advantages to be derived from "wedge" type mirrors of the types above noted, but also embodies the advantages of the present invention in permitting front view vision through at least a portion thereof. Thus, said front surface reflective mirror coatings 81 and 83 are partially transparent and similar to those described in connection with prior art wedge mirrors. However, in contrast to such prior "wedge" mirrors, according to the present invention, there is necessarily placed on the rear surface 79 of the mirror support body 77 in the particular arrangements described a partially transparent reflective coating. To be more particular, said coatings 80 to 84 are shown herein as extending over the entire width of each surface of said support body. In order to provide multiple images over the entire surface, it is obvious that opaque areas when used must in each case be applied to the rear surface or rear coating only, as shown in Figures 6, 6a, 6c, and 6d.

The frame member 85 of mounting 76 is substantially similar to frame 27 of mirror assembly 20 and the various parts comprising the same have been assigned the reference characters of similar frame member 56. A slight modification would be necessary, of course, in enlarging the lower finger 32 to accommodate the thick edge of "wedge" shaped support body 77.

The remainder of mounting 76 includes a ball member 86 slidably maintained in seat 39 of frame 85 for universal movement with respect thereto, an intermediate arm 87 extending outwardly from said ball member, and a bifurcated end arm 88 which receives and is pivotally attached as at 89 to a tongue member 90 on said intermediate arm. The outer end of arm 88 is suitably threaded as at 91 for attachment to a rigid part of an automobile and the opposite inner end is bored as at 92 to receive a spring-loaded ball 93. Projecting outwardly from the tongue member 90 on intermediate arm 87 is a notched finger 94 which is resiliently engaged by the ball 93.

A handle 95 depending from the arm 87 permits the driver to manually manipulate the position of the notched finger 94 with respect to the ball 93 of rigidly mounted arm 88 so as to move the surfaces of mirror member 75 to three distinct and angularly related positions. In this manner, of course, the three rear view images of different light intensities for each of the mirror members of Figs. 13, 13a and 13b may be obtained. This mounting 76 is shown and more particularly described in Patent No. 2,588,792 to D. W. Barkley.

While rear view mirrors of the present invention are limited to a maximum reflection or transmission of 73% by the 2.7 to 1 or 1 to 2.7 ratios, this provides an excellent range of reflection values for daytime use since it is not generally desirable to have a daytime rear view reflection in excess of this value so that excessive snow or road glare will be cut down while otherwise providing excellent daytime rear view. For nighttime driving, it has generally been found desirable to use a mirror having a reflection of less than 30% and as low a value as the 4.25%, such as is provided by the front uncoated surface of the Bell "wedge" mirror. The mirrors of the present invention may easily be made to provide such useful mirror ranges in either flat or "wedge" form, as will be seen from the following examples. Mirrors with a minimum of 8% light transmission are still useful rear view automobile mirrors for the purposes of this invention provided, of course, that the reflectivity is correspondingly low in accordance with the ratios indicated. Therefore, by "partially transparent" reflective films or coatings I mean films with at least 8% light transmission. In the case of opaque coatings the word "opaque" denotes a film or coating through which images may not be seen and more generally of less than 1% light transmission.

It will be apparent that due to the location of the rear view mirror in an automobile to the right of the driver and either at or somewhat above his normal eye level, at night the lights of oncoming automobiles which are to the left of the driver will not appear in the mirror so that the mirror seldom presents any images to the driver by transmission due to his normal line of forward sight except in the case of an occasional lighted sign or the upper parts of store fronts. On the other hand, the rear view mirror of the present invention does permit the ready sighting therethrough of traffic lights. However, the comparatively low intensity of such illuminations has been found to present no difficulties with this mirror and at night the mirror appears most of the time as though it were the ordinary opaque rear view mirror inasmuch as most of the time the forward field of view is dark. Thus, when using a "wedge" type mirror made in accordance with this invention, which mirror presents several selective ranges of reflectivity of the rear view, there is no real possibility of light transmission at night through the mirror which would cause any difficulties. As to these "wedge" mirrors it will be understood that the 2.7 to 1 or 1 to 2.7 ratio of transmission of the mirror to reflectivity from the mirror is applied only with respect to the reflection value of the brightest image which is the image selected for use in daytime and thus under the only circumstance in which the brightness intensity of the forward field of vision is high. It will be apparent that since the other choices of reflection value used at night are lower, the ratio of the common transmission value of the mirror (which is constant under all conditions) to such lower reflection values may actually be outside of the ratios limits set up and essential for good daytime operation.

The transparent support bodies are preferably made from polished plate glass having both surfaces polished in the usual manner. The "wedge" type mirrors may be formed of solid glass or from two separate pieces of glass also having opposite polished surfaces which are inclined to one another at a small angle, such as approximately 3 degrees. The "wedges" and the flat glass mirror support bodies may be of clear glass with its usual high light transmission of approximately 92% or they may be made of colored glass supports such as the flesh pink of 83% transmission, the golden yellow of 87%, the green-blue of 72%, the blue of 36%, sold by leading glass manufacturers, or other colored glasses of reduced transmission. These glasses permit the forming not only of colored transmitted rays but, in the case of mirrors having a reflective coating on the rear surface thereof, also give a colored reflection effect. By means of such colored support bodies the transmission value of a mirror can be reduced where the reflective coating is on the front surface thereof, as in the case of front surface mirrors, without at the same time altering the reflection value of such coating on the front of the glass. Thus, combinations of such structures, which would provide too much transmission with a given mirror coating on clear glass, can be used to provide front surface mirrors with the proper ratios of transmission and reflectivity wherein the colored glass support bodies serve to cut the transmission down to a desired figure with respect to the reflection. When the mirrors are formed with the reflective coating operating from the rear surface as in second surface mirrors, it is apparent that the use of a colored glass support body reduces both the reflection and the light transmission to a degree in proportion to its light transmission value and thus both the reflection and transmission values are reduced, as compared with a mirror having the same coating on clear glass.

It will also be evident as more particularly shown by the following examples that the reflective films may provide color and a coating may actually be built up of a number of films so as to produce a given color or degree of reflection and transmission in accordance with light interference phenomena. The coatings used for the mirrors of the invention may be formed in any suitable manner, such as by thermal evaporation in a vacuum or by chemical deposition, and may comprise any of the many mirror reflective coatings which can be formed in partially transparent form. Since the coatings are at least partially exposed to handling, the corrosion resistant hard coatings provided by chromium, manganese, vanadium, nickel, inconel, titanium and the metal oxides and fluorides, such as aluminum oxide, titanium oxide, and magnesium fluoride, are particularly useful.

It will also be apparent as shown by the various examples to follow that the visually adjacent transparent and opaque mirror areas need not be of the same color or reflectivity. The dividing line between the opaque and transparent areas is of course very evident when the mirror is used for transmission purposes but when it is used for rear viewing, the line is only faintly apparent to the mind of the driver, said line being the less apparent the closer the adjacent opaque and transparent areas of the mirror surfaces, providing the day or brightest image, are in reflectivity. For this reason, in a preferred form of this invention these areas are of the same approximate reflectivity which can readily be secured where a reflective coating extends over the entire coated surface and the opaque area is secured by painting an opaque section or sections thereon by the use of a black or opaque paint inasmuch as such backing of a reflective coating with an opaque paint does not change the reflectivity of the reflective coating. On the other hand, when a reflective opaque coating is formed in back of a coating which extends over the entire surface of the support body, it will generally increase the reflectivity from such opaque area when such reflective opaque coating is of a generally higher reflection value as determined when said coating is directly applied alone to glass.

*Examples 1, 2, and 3*

A blank of clear polished plate glass of an oval shape approximately 9.5 by 2.5 inches in extreme dimensions was employed in making the rear view mirrors of these first three examples. Each of the blanks was coated on the front surface thereof by thermal evaporation in a high vacuum with a partially transparent coating of chromium which gave a reflection value of 30% and a light transmission value of 30%. The ratio of such properties is 30/30 or 1/1 and when a first blank so coated was placed in a mounting, as in Figures 1 to 4, and used directly it provided an excellent rear view mirror through which one could also alternatively see automobiles or scenery under all combinations of lighting of objects, roads, and sky. The back or uncoated surface of the second blank was painted with black opaque paint along a central area 4 inches wide and extending from top to bottom thereof. This second blank was placed in a similar mounting, none of which was actually visible when used by the driver due to the blocking out of the same by the opaque area. This mirror performed excellently in driving use and was of the same 30% reflection value both in the transparent and opaque areas and obviously of the same transmission value in the transparent area. The back of the third blank was also coated on the same central area as the second blank with an opaque reflective coating by chemical deposition of lead sulfide using a mask to restrict the coating to the desired central area. The central opaque area then had a reflection value of 30% while the two transparent areas to either side of such central area were of the values above indicated in connection with the other two examples. Placed in the same mounting, this latter blank performed as excellently as the other two rear view mirrors. Obviously, the ratio of reflection to transmission which has to be considered in each of these cases is based on the properties of the partially transparent reflective areas only. The areas of each of these mirrors were of a neutral gray color as was also the transmitted light.

*Example 4*

The front surface of a 10 inch blank of clear polished plate glass was coated with a partially transparent coating of chromium to produce a front surface mirror of 43% reflection and 16% light transmission. At this point in the thermal evaporation process, a shield was brought before the blank, leaving exposed only the central 3 inch area of the blank, and more chromium was then evaporated until this central area was made opaque. This central area then showed a reflectivity of 55%. The 3½ inch partially transparent areas at each end of the mirror thus had a ratio of reflection to transmission of 16/43 or 1/2.68.

*Example 5*

A similar 10 inch blank of clear plate glass was coated on its front surface with a chromium coating of 35% reflectivity and 25% light transmission. These transmission and reflectivity values are of the ratio 25/35 or 1/1.4. Black paint was applied to the central 3 inch area on the rear uncoated surface of the blank as well as to the end 1½ inch areas, as shown in Figure 10, to produce three opaque sections of 35% reflectivity.

*Example 6*

The front surface of a six by two inch square shaped blank of plate glass was coated by thermal evaporation with chromium of sufficient thickness to provide a mirror of 22.5% reflectivity and 45% light transmission. The ratio of these properties was thus 2/1. The central 2 inch area was painted with black paint on its rear or uncoated surface to provide an opaque area having 22.5% reflectivity. This mirror operated, when placed in a mounting of the type shown in Figures 1 to 4 or 7 to 9, as an excellent rear view automobile mirror providing both vision ahead and to the rear.

*Example 7*

While the examples above given show various types of first surface rear view mirrors, second surface mirrors may also be readily prepared. Thus, chromium was deposited upon the rear surface of a 10 inch long clear plate glass blank in a high vacuum to a thickness to give a reflection value of 16% and a light transmission of 30%, when the mirror was viewed from the uncoated or front side. Thereafter the coated surface was masked at two areas, each being 2 inches wide and located at 1½ inches in from each extreme end of the blank. The two exposed end areas as well as the exposed central area of 3 inches when coated with a lead sulfide mirror coating in an opaque thickness by chemical deposition directly upon the chromium coating. After removal of the masks, the mirror structure was of the types shown in Fig. 11, and the opaque areas thereof showed a reflection value of 34% which differs from the 16% reflectivity in the transparent areas. The ratio of the transmission to the latter reflectivity in said transparent areas was 30/16 or 1.88/1.

*Example 8*

A similar clear plate glass blank of 9 inches in length was coated on its rear surface with a partially transparent coating of chromium of 22% light transmission. When viewed from its uncoated or front face, the mirror had a reflectivity also of 22%, thus giving a ratio of these values of 1/1. Black paint was then applied as an opaque coating upon the central 3 inches and the extreme end ½ inch areas of the rear surface, leaving between said opaque areas two 2½ inch wide partially transparent reflective areas. The painted areas also showed a reflection value of 22% when viewed from the front surface of the mirror. This provided a very excellent rear view mirror when placed in a mounting such as shown in Figures 7 to 9 and illustrates a preferred example of a highly suitable rear view mirror for automobile use, or for other vehicular use.

*Example 9*

A nine inch clear glass blank was coated upon its rear surface with a partially transparent film of chromium to provide a mirror having a light transmission therethrough of 14% and a reflectivity, when viewed from the uncoated front side, of 30%. When placed in a mounting of the type shown in either Figures 1 to 4 or Figures 7 to 9, the rear view mirror of this example was found very suitable and was partially transparent in all areas not blocked directly by the mounting. The ratio of the two light values was 14/30 or 1/2.14.

*Example 10*

A mirror in which the partially transparent coating was similarly placed on the rear surface of the mirror was made by coating a nine inch blank of clear glass, in rear view automobile mirror shape, with chromium in a high vacuum until the mirror showed a second surface reflection of 26% and a light transmission of 20%. The ratio of such values is 20/26 or 1/1.30. The coated mirror blank was then turned over and on the uncoated side there was applied a much thicker coating of chromium such that this latter coating was opaque. This last coating was applied only in a central 3 inch area so that two end areas of the mirror remained coated only on the one side thereof when placed in a suitable mounting having transparent areas corresponding to those of the mirror blank, the mirror of this example provided a central area of 55% reflection from the front surface thereof and a reflection of 26% from the rear surface in the partially transparent sections.

*Examples 11 and 12*

Blanks of 10 inches length and 2 inches width were cut from a green colored glass of 17% light transmission and from a grey-green colored glass of 30% light transmission. The front surface of each was coated in a high vacuum with a very thin layer of chromium to provide 15% light reflection therefrom. A similar clear blank of ordinary plate glass was coated at the same time and it showed 15% reflection and 60% light transmission. Since the ratio, in the latter case, of transmission to reflection was 4/1, the mirror so formed was unsatisfactory as a rear view automobile mirror since the overly high transmission tended to wash out the rear view images so that these were both faint and illusory. On the other hand, the green and grey-green glass mirrors showed light transmissions of 10% and 18%, respectively, when coated reflectively, as noted above. Thus, the ratios in these two cases were, respectively, 10/15 or 1/1.50 and 18/15 or 1.2/1, and in each case the transmitted light was of a grey-green coloration while the first surface mirror reflections were of a normal neutral metallic appearance. The central 6 inches of the mirror having 10% transmission was painted on the back uncoated surface with black opaque paint. The two mirrors thus prepared were excellent in use in an automobile and gave a good view of both the rear and the forward conditions through the mirror alternately as the eye focus was changed by the driver.

*Example 13*

A 10 inch blank of glass was coated on its rear face with the partially transparent chromium coating described in connection with Example 7. However, the glass blank used in the present example was cut from Aklo blue-green glass of 49% light transmission, this type of glass being produced by Libbey-Owens-Ford Glass Company. The coated blank had a light transmission of 15% and a second surface blue-green reflection of 8%, or a ratio of such values of 1.88/1. This mirror was found to be quite satisfactory in day and night driving and alternately provided good vision both to the rear and through the mirror to the front when placed in a suitable frame of open construction.

*Examples 14 and 15*

Two eight inch long blanks of colored glass, one of which was a blue glass of 36% light transmission and the other a flesh pink color of 83% light transmission, were coated in a high vacuum on the rear surfaces thereof with a coating of chromium of the same thickness as used in Example 8 on the rear surface of a clear glass blank. The coated blue glass blank provided a reflection from the uncoated or front face of 8% and a light transmission of 8%, while the flesh pink coated glass provided a reflection value from the uncoated face of 18% and a light transmission of 18%. Both the reflections and transmissions were colored by the glass. In each instance the ratio of these two values was 1/1, as was the case in Example 8, although each value was reduced from those in which the clear glass was used in accordance with the light transmission value of the uncoated colored glasses. Both mirrors were painted with opaque black paint on a central 4 inch area, the paint in each case being applied to the coated surfaces. When placed in mountings of the type shown in Figures 7 to 9, these mirrors were excellent rear view automobile mirrors in both day and night driving conditions. The opaque areas on the blue and pink colored glasses had, respectively, reflectivities of 8 and 18%.

*Example 16*

The central 4 inches of the rear surface of a blank of the blue glass of the type described in the above example was coated with an opaque coating of copper by thermal evaporation, while the remainder of the rear surface was masked to prevent the deposition of any of said coating thereon. After the copper deposition was completed, the mask was removed and a transparent coating of chromium of the type employed in Examples 8, 14, and 15 was evaporated directly upon the copper-coated as well as the uncoated areas of the rear surface of the blank. This provided a mirror with two two-inch end areas of 8% reflection and 8% light transmission, each being colored blue, and a central opaque reflective mirror area of 12% light reflection, the color of the latter area being of a redder blue or purplish shade. This mirror was found to be excellent in use under all lighting conditions. A similar mirror was made in which the copper coating was masked during the coating with chromium over the unmasked end areas.

*Example 17*

A quarter wave length light interference coating of titanium dioxide, based on 5500 Angstrom units light as the center of the visible spectrum, was formed upon the front surface of a clear colorless blank of plate glass to provide a reflection from said front surface of 26% and a light transmission of 70%, each beam being substantially colorless. The ratio of these values is 70/26 or 2.69/1. On the central 5 inches of the rear uncoated surface of the 8 inch blank, black paint was applied as an opaque layer to provide an opaque area of 26% reflectively. This mirror, while not as good as most of the above described mirrors, operates sufficiently well to be useful as an automobile rear view mirror although any higher ratio of transmission would be unsatisfactory.

*Example 18*

A three layer light interference reflective coating of partially transparent nature was built up on the front surface of a clear blank of plate glass by alternately depositing by thermal evaporation within a vacuum of a layer of zinc sulfide, a layer of magnesium fluoride, and a layer of zinc sulfide, each of said layers being formed of a quarter wave thickness of the respective material with respect to 5500 Angstrom units as the basis for setting such thicknesses. The resulting mirror, when viewed from the coated side and arranged in an automobile in a mounting of the type shown in Figures 1 to 4, had a reflection value of 48% and a light transmission value of 48% resulting in a ratio of 1/1. This mirror provided excellent daytime use, either in viewing forward through the same or in viewing rear view images, and no confusion in such alternate uses was found. While the reflection value is somewhat high for night driving, this mirror was preferred by some in spite of the glaring tendency.

*Example 19*

As an example of an automobile mirror for rear view and forward view use in which the two viewed images are of different colors, the following example was prepared. A seven layered interference coating which was selectively of very high reflection in the blue visible part of the spectrum and of very high transmission in the yellow and red visible part of the spectrum was used. The mirror so formed showed a spectral reflection curve of over 90% reflection value in the wavelengths of 4000 to 5000 Angstrom units, dropped steeply to 10% reflection by 6000 Angstrom units, and did not rise beyond 25% in the remainder of the visible red end of the spectrum. The spectral light transmission for this coating was the exact inverse of this in the same respective regions, being less than 10% in the blue and of over 75% generally in the red. However, the overall light reflection value throughout the visible was only 34% and the overall light transmission value throughout the visible was only 44% and these are the figures that determined the relative brightnesses of the reflected and transmitted images brought to the eye when the coated blank was used as a rear view automobile mirror. The ratio of these values is 44/34 or 1.29/1.

This mirror was made by applying to the rear surface of a 10 by 2½ inch blank of clear plate glass by thermal evaporation in a high vacuum a quarter wave thickness of titanium dioxide, a quarter wave thickness of magnesium fluoride, and successive alternate layers in such order of these two materials in said thicknesses until a total of 7 layers had been applied, the last layer being the same as the first, namely, titanium dioxide. Thus, there were applied four titanium dioxide layers alternated with three magnesium fluoride layers. Each of these seven layers was applied as a one quarter wave thickness based upon the wavelength 4400 Angstrom units which is the wavelength at which the coated mirror produced showed a maximum or peak in its reflection curve.

Upon this seven layered coating, black opaque paint was applied to only the top half of the central 3 by 1¼ inches of area of the mirror. Since the opaque central area extended only halfway down from the top of the mirror, the bottom half of the mirror was partially transparent entirely along the length of the mirror. The reflection in the opaque area, as in the rest of the mirror, was 34% and the color as seen by reflection in either the opaque or transparent area was blue. When the mirror was looked at, the opaque area gave the impression of being a deep blue, although when the mirror was used as a rear view automobile mirror, the rear image field was uniformly blue over the entire area of the mirror. The transmitted light of the forward view was yellow due to the high transmission of yellow and red light and the high sensitivity of the human eye to yellow light. This mirror gave excellent results in an automobile as a rear view mirror for looking either to the rear or through the mirror to see cars approaching from the side and forwardly of the driver.

*Example 20*

A 10 inch blank of clear plate glass of rear view mirror shape was coated on its entire front surface with a partially transparent coating of chromium, as in Example 1. Upon the central 3 inch area only of this chromium coating there was then deposited by thermal evaporation and with the use of masks an opaque layer of copper. Similarly to the mirror of Example 1, this mirror had a neutral reflectivity of 30% and 30% light transmission of neutral shade in the partially transparent area, and in the opaque area, it had a copper colored reflection of 65%.

*Example 21*

A "wedge" of clear glass with a three degree angle between the opposite faces thereof was coated on the rear face with a coating the same as was applied to the front face of a glass plate in Example 18. Opaque black paint was then applied directly to this coating in the central 4 inch area of the 8 inch wedge. The mirror was then placed in a suitable mounting to provide a selection of image positions as shown in Figure 12, the frame backing portions of the mounting being behind the opaque painted central area. The mirror thus made provided a nighttime reflection from the uncoated front face of 4.5% and a daytime reflection from the rear face in both the painted opaque and in the unpainted partially transparent areas of 43%. As in the case of Example 18, the partially transparent area was of 48% light transmission. The ratio of the transmission to the brightness of the bright or daytime image was thus 48/43 or 1.12/1.

*Example 22*

An 8 inch "wedge" was prepared with a coating of Example 21 on the rear surface. The front surface was then coated with a partially transparent coating of chromium of a thickness such that on a flat glass blank it had a reflection from the coated side of 10% and a light transmission of 70%. The "wedge" so coated had a light transmission of 34% which was the result of the light transmission effects of the two coatings, namely 70%×48%. On the central 4 inches of the interference three layered coating on the rear surface of the "wedge," black paint was applied to provide an opaque area. From the front surface coating of chromium there was secured a 10% reflection useful in night driving. From the rear surface of the "wedge" a reflection of 23% was secured, such being the resultant of the reflection properties of the rear coating modified by the properties of the front coating. When placed in a suitable mounting which permitted shifting of the mirror angularly to select the images from the one face or the other, the mirror proved very satisfactory in use as an automobile mirror. Of course, the outer two inch partially transparent end areas on the mirror were superimposed over openings in the mounting to permit viewing therethrough. The ratio of the transmission thus available to the brightness of reflectivity of rear view images in daytime, obtained by using the bright image, was thus 34/23 or 1.48/1 and, in such daytime use, the mirror could alternately be used to present rear view images or be viewed through as the driver would change his focus.

*Example 23*

The front surface of an eight inch "wedge" similar to the one of Example 22 was coated with a three layered coating, as was used in Example 18 and the rear surface was coated with a single layer interference coating, as was used in Example 17. Black opaque paint was applied to the central 4 inch area over the single layer coating on the rear surface of the "wedge." The mirror was then placed in a suitable mounting having the framing members therefor concentrated behind the opaque mirror section and having either clear areas or openings to the sides of the framing members. These openings corresponded to the two partially transparent end areas of 2 inches width so as to not obstruct vision through such areas of the mirror. Any suitable shifting apparatus, such as, for example, that shown in Figure 12 which provides a plurality of positions for angularly moving the mirror to select the various separate images provided by this mirror, may be used. In this mirror the image formed by reflection from the front surface of the mirror is of the highest reflectivity and is the image which would be used in daytime driving. This image is 48% reflective and the light transmission through the coatings in the partially transparent end areas of the mirror is 34% (48×70). The ratio then is 34/48 or 1/1.41. In daytime the mirror worked well in providing rear view and forward view through the same alternatively. The mirror also provided an alternative selection of three other images for night driving in addition to the day or bright image. Since the day image of this mirror is 48% reflective, it is not particularly useful for most night driving conditions. However, this value is excellent in daytime and the other reflective values of 7%, 1%, and 0.2% may alternately be selected such that any nighttime glare condition may be easily avoided, with the 7% reflection value offering excellent utility for night driving generally. The values for each of the four ranges of reflectivity apply to the entire mirror area whether it be partially transparent or opaque.

It is to be understood that the forms of the invention disclosed herein are to be taken as the preferred embodiment thereof, and that various changes in the shape, size and arrangement of parts may be resorted to without departing from the spirit of the invention or the scope of the following claims.

I claim:

1. A rear view mirror for providing a view to the rear of a vehicle and also for providing vision therethrough to the front of the vehicle comprising, a partially transparent support body having opposite surfaces, an opaque reflective area over only a portion of said support body, and a partially transparent reflective coating on at least one of said surfaces, said coating having a minimum reflectivity of 8% to provide clear reflected images and said mirror having a minimum light transmission of 8% therethrough, the ratio of the transmission of the mirror to the reflectivity of the coating falling within the range of approximately 2.7/1 to approximately 1/2.7, with said support body being composed of a light absorptive material which serves in cooperation with the partially transparent coating to provide said ratio of light transmission to reflectivity.

2. A rear view mirror for providing a view to the rear of a vehicle and also for providing vision therethrough to the front of the vehicle comprising, a partially transparent support body having opposite surfaces, a partially transparent reflective coating on at least one of said surfaces, and an opaque reflective area formed of an opaque non-reflecting coating behind said partially transparent reflective coating and over only a portion of said support body, said partially transparent reflective coating having a minimum reflectivity of 8% to provide clear reflected images and said mirror having a minimum light transmission of 8%, the ratio of the transmission of the non-opaque portion of the mirror to the reflectivity of the partially transparent coating falling within the range of approximately 2.7/1 to approximately 1/2.7.

3. A rear view mirror for providing a view to the rear of a vehicle and also for providing vision therethrough to the front of the vehicle comprising, a partially transparent support body having opposite surfaces, a partially transparent reflective coating on at least one of said surfaces, and an opaque reflective area formed of an opaque reflective coating over only a portion of said support body, said partially transparent reflective coating having a minimum reflectivity of 8% to provide clear reflected images and said mirror having a minimum light transmission of 8%, the ratio of the transmission of said non-opaque portion of the mirror to the reflectivity of the partially transparent coating falling within the range of approximately 2.7/1 to approximately 1/2.7.

4. A rear view mirror for providing a view to the rear of a vehicle and also for providing vision therethrough to the front of the vehicle comprising, a partially transparent support body having opposite surfaces, a partially transparent reflective coating on at least one of said surfaces, and an opaque reflective area formed of an opaque reflective coating adjacent to said partially transparent reflective coating and over only a portion of said support body, said partially transparent reflective coating having a minimum reflectivity of approximately 8% to provide clear reflected images and said mirror having a minimum light transmission of approximately 8%, the ratio of the transmission of said non-opaque portion of the mirror to the reflectivity of the partially transparent coating falling within the range of approximately 2.7/1 to approximately 1/2.7.

5. A rear view mirror as claimed in claim 4, wherein said support body is wedge-shaped so as to reflect from said opposite surfaces two or more things.

6. A rear view mirror for providing a view to the rear of a vehicle and also for providing vision therethrough to the front of the vehicle comprising, a partially transparent support body having opposite surfaces, said mirror having an area providing a minimum reflectivity of approximately 8% to provide clear reflected images and a minimum transmission therethrough of approximately 8% to provide vision through said mirror, and a second reflective area provided on said support body and over only a portion thereof, said second reflective area being of a different reflectivity than said first-named area, said areas of different reflectivities cooperating to reflect images from light sources striking said mirror such that the ratio of the transmission of said first-named area of the mirror to the reflectivity of such area is such that clear images may be had under day-light and night-time conditions.

References Cited in the file of this patent
UNITED STATES PATENTS

| | | |
|---|---|---|
| 1,493,609 | Dailey | May 13, 1924 |
| 1,871,877 | Buckman | Aug. 16, 1932 |
| 2,033,391 | Muench | Mar. 10, 1936 |
| 2,100,938 | Brandt | Nov. 30, 1937 |
| 2,615,368 | Bindley | Oct. 28, 1952 |

UNITED STATES PATENT OFFICE

CERTIFICATE OF CORRECTION

Patent No. 2,796,805                          June 25, 1957

Willard L. Morgan

It is hereby certified that error appears in the printed specification of the above numbered patent requiring correction and that the said Letters Patent should read as corrected below.

Column 18, line 12, for "things" read -- images --.

Signed and sealed this 15th day of October 1957.

(SEAL)
Attest:
KARL H. AXLINE
Attesting Officer

ROBERT C. WATSON
Commissioner of Patents